United States Patent [19]

Baus et al.

[11] Patent Number: 4,501,845

[45] Date of Patent: Feb. 26, 1985

[54] EMULSION POLYMER OF HETEROGENEOUS MOLECULAR WEIGHT AND PREPARATION THEREOF

[75] Inventors: Richard E. Baus, Warminster; Graham Swift, Blue Bell, both of Pa.

[73] Assignee: Rohm and Haas Company, Philadelphia, Pa.

[21] Appl. No.: 499,127

[22] Filed: May 31, 1983

Related U.S. Application Data

[63] Continuation of Ser. No. 313,400, Oct. 21, 1981, abandoned, which is a continuation of Ser. No. 119,728, Feb. 8, 1980, abandoned.

[51] Int. Cl.³ .............................................. C08F 2/16
[52] U.S. Cl. .................................... 524/460; 524/458; 526/80
[58] Field of Search ............................... 524/460, 458

[56] References Cited

U.S. PATENT DOCUMENTS

| | | | |
|---|---|---|---|
| 2,473,929 | 6/1949 | Wilson | 260/29.6 |
| 2,662,866 | 12/1953 | Bristol | 260/29.6 |
| 3,485,808 | 12/1969 | Wiesner | 526/80 |
| 3,547,857 | 12/1970 | Murray | 524/458 |
| 3,887,610 | 6/1975 | Kober | 260/29.6 |
| 4,126,595 | 11/1978 | Martorano | 260/29.6 |
| 4,254,004 | 3/1981 | Abbey | 524/458 |

OTHER PUBLICATIONS

J. Polymer Science, vol. 46, pp. 75–89, 1960.

Primary Examiner—Paul R. Michl
Attorney, Agent, or Firm—Alex Sluzas; Robert A. Doherty

[57] ABSTRACT

Disclosed is a polymer and its preparation by reacting part of the monomers in the reactor in such a way as to obtain a high molecular weight product, and reacting at least one other portion of the monomer in the same reactor in such a way as to obtain at least one low molecular weight fraction. The products are useful in contact adhesives, particularly when blended with an aminoplast or phenoplast as a tackifier and crosslinker, and with a thickening agent such as polyvinyl alcohol.

10 Claims, 3 Drawing Figures

EMULSION POLYMER OF HETEROGENEOUS MOLECULAR WEIGHT AND PREPARATION THEREOF

This is a continuation of application Ser. No. 313,400 filed Oct. 21, 1981, abandoned, which is a continuation of Ser. No. 119,728 filed Feb. 8, 1980, abandoned.

The present invention is concerned with the production of emulsion polymers, preferably acrylic polymers, which are particularly useful to prepare contact cements. By contact cement is meant a cement which has a capacity to bond two substrates well enough on initial assembly to hold the assembly together without employing extended nip-roll or clamp pressure.

The latex polymers of the invention have substantial proportions of high molecular weight fractions and low molecular weight fractions. The divergent molecular weights are achieved by a novel polymerization procedure in which staged introduction of chain transfer agent is utilized.

BACKGROUND OF THE INVENTION

Contact cements or adhesives are polymer solutions or dispersions which are applied to two surfaces, dried, and the mating surfaces are then pressed together, usually without heat. The dried surfaces are essentially non-tacky and will not adhere to most materials except to another coating of the same adhesive. Care must be used in aligning the two articles or surfaces to be bonded, since the bonding is essentially instantaneous and the articles cannot be moved relative to one another in order to put them into register once contact has been made. This "instant-grab" property of contact adhesives has the important advantage that long periods of aging or oven curing are not needed. For on-site applications, such as laminating a plastic surface sheet material to a kitchen countertop, the advantages of the use of contact adhesives are particularly valuable.

As is shown by U.S. Pat. No. 2,976,203 and 2,976,204 to Young (assigned to the assignee of the present application) it is known to utilize chain transfer agents to lower the molecular weight of acrylic latex polymers useful as pressure sensitive adhesives and as contact cements. Another reference showing that chain transfer agents are known for making pressure sensitive adhesives is U.S. Pat. No. 3,806,484, in which the acrylic monomers are pre-emulsified along with the chain transfer agent, or, as understood, the emulsion is polymerized in increments wherein the chain transfer agent is added in the same quantity to each stage or increment of the emulsion being polymerized.

A patent relating to synthetic rubber, U.S. Pat.No. 4,145,494, shows the polymerization of diolefins, optionally with minor proportions of monoethylenically unsaturated monomers such as acrylic acid, methacrylic acid, itaconic acid, esters thereof, styrene, etc., in emulsion, during which large amounts of chain transfer agents are added after at least 75% of the monomers are polymerized. A shortstopping agent is added to prevent complete conversion of the monomer to polymer. No such agent is used in the present invention.

Contact adhesives differ from pressure sensitive adhesives in that they are essentially non-tacky (although they adhere to one another), while pressure sensitive adhesives retain a permanent, aggressive tack. This may be illustrated by comparing tack ratings of contact and pressure sensitive adhesives in conventional tack tests such as the Rolling Ball Tack Test. In this test, a 7/16" steel ball is rolled down a 6 inch, 45° inclined steel sheet onto the horizontal adhesive surface in the form of a dry coating of about 1 mil in thickness. A pressure sensitive adhesive is expected to stop the ball after it has travelled only one or two inches across the adhesive surface. Conversely, contact adhesive will permit the steel ball to roll almost indefinitely.

Traditionally, contact adhesives have been based on solutions of poly(chloroprene) or neoprene, in combinations of solvents such as toluene and methyl ethyl ketone. Recent government regulations restricting use of such solvents has sparked adhesive manufacturers to seek alternate systems which pose significantly lower flammability and pollution hazards.

Aqueous adhesives seem to be ideal candidate replacements for the hazardous solvent systems. However, early aqueous neoprene latices lacked the high bond strengths shown by their solvent counterparts, and they are not stable to freezing and thawing. In a subsequent innovation, it was found that the deficiency could be overcome by using specialty acrylic latices such as 87.5 ethyl acrylate/10 methyl methacrylate/2.5 itaconic acid with a poly(vinyl alcohol) thickener and a benzoguanamine-formaldehyde condensate crosslinker. While this may be used without safety hazards to provide high strength wood-to-plastic laminates, the system requires higher lamination pressure than customers desire, and thus greater combinability was sought. Improved combinability, as evidenced by good adhesion with low lamination pressure, can be achieved by incorporation of tackifiers and plasticizing solvents, reducing Tg, or dropping molecular weight. However, in all cases combinability is achieved along with an unacceptable loss in elevated temperature performance.

Extensive testing of contact adhesives has indicated that performance in terms of adhesive properties such as lap shear, high temperature cleavage, legginess, combinability, etc., is related to the type and amount of acid functionality in the polymer backbone and the type and amount of crosslinker. However, it is apparent that performance is even more dramatically related to molecular weight of the polymer. High molecular weight improves lap shear adhesion and cleavage properties, but downgrades legginess, combinability, and bond fusion. The exact opposite is true of low molecular weight polymers.

DETAILED DESCRIPTION

The invention provides polymers or polymer fractions with a range of molecular weights from very high to very low and of the proper balance to give good contact adhesive strength in conjunction with good legginess, combinability and bond fusion. To achieve this a substantial portion of the monomers are polymerized to a high molecular weight. The high molecular weight polymer provides adhesive strength and high temperature cleavage properties. Another portion of the monomers is polymerized to a low molecular weight fraction, also present in a substantial proportion, which imparts legginess and combinability.

Figure 1:
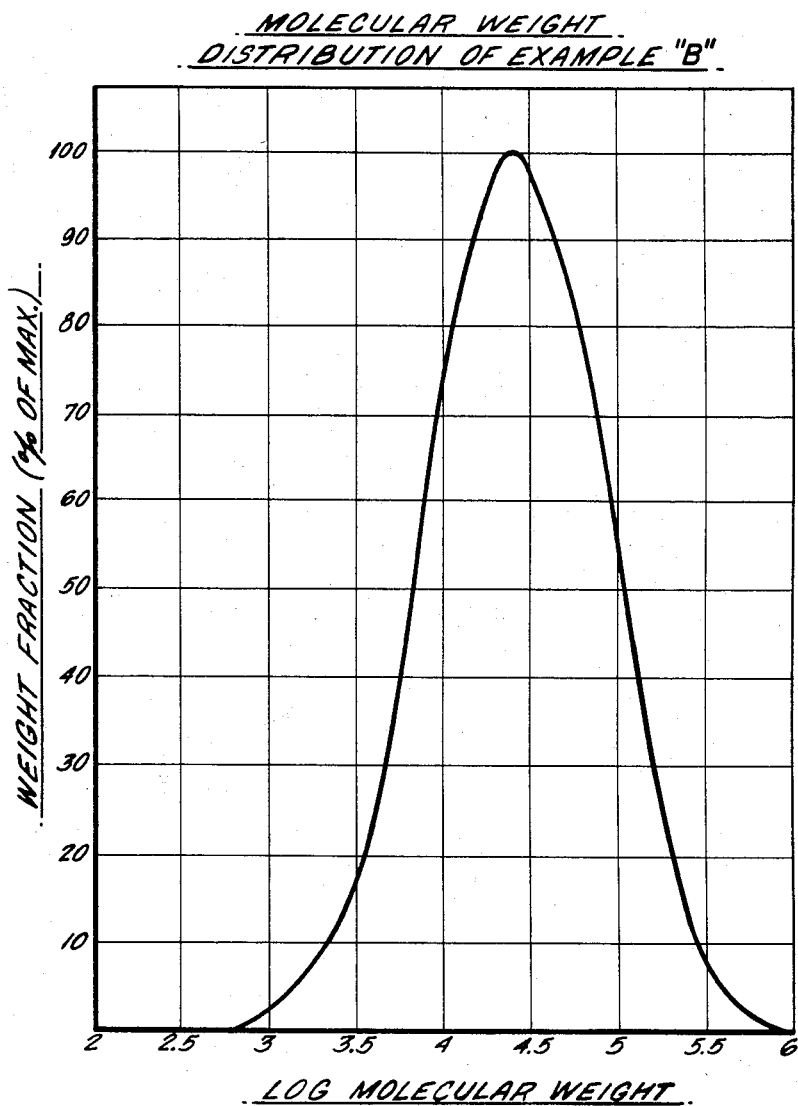
Figure 2:
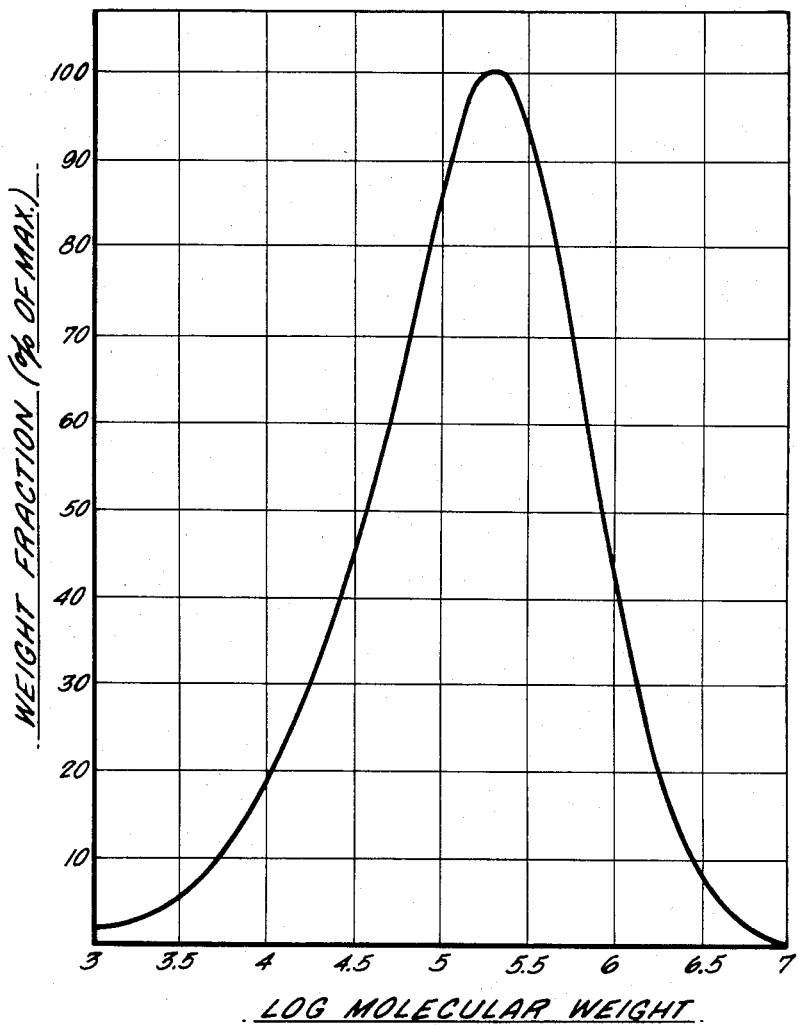
Figure 3:
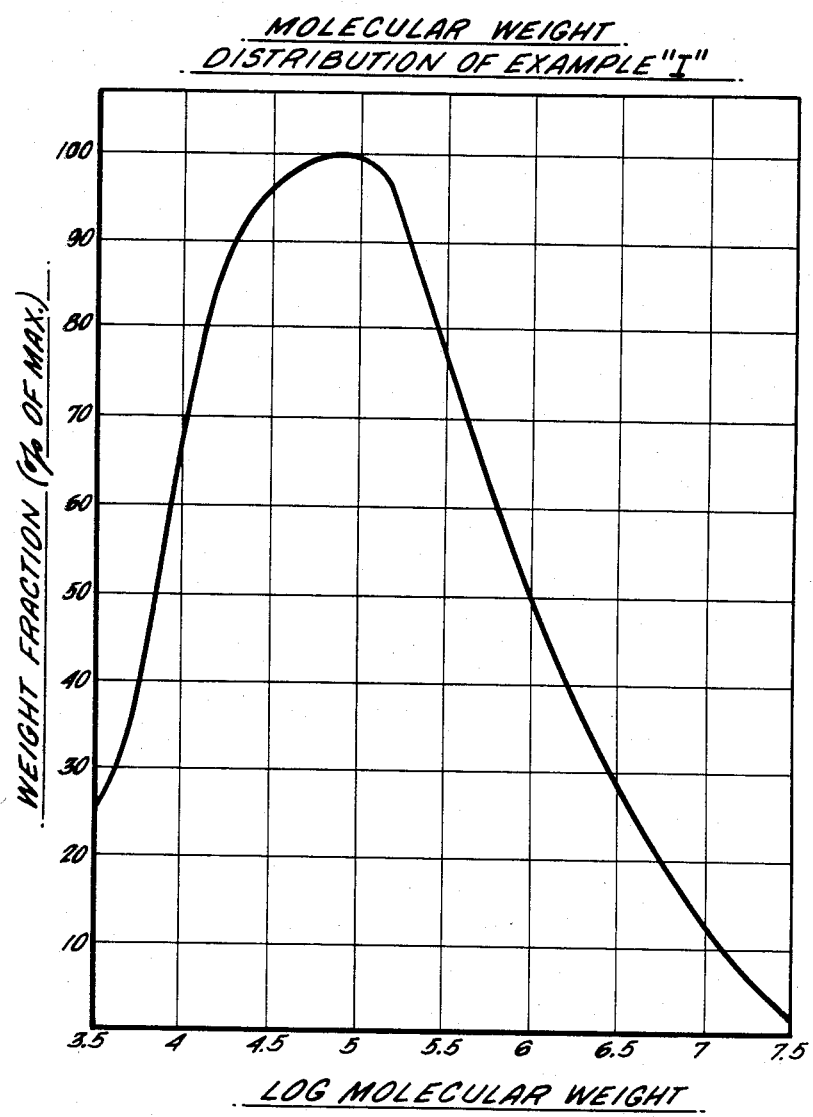

Typical molecular weight distributions, determined by gel permeation chromatography, are shown in the drawings. FIG. 1 concerns the product of Ex. B, FIG. 2 concerns the product of Ex. E, and FIG. 3 represents the product of Ex. I.

The polymers of the present invention are aqueous dispersions of a water-insoluble copolymer, preferably acrylic in nature, and water insoluble salts thereof, of 0.5–15%, preferably 1–12% by weight of a carboxylic acid selected from the group consisting of acrylic acid, itaconic acid, maleic acid fumaric acid, methacrylic acid, and crotonic acid, and mixtures thereof, more preferably a mixture of 5–10% of methacrylic acid with 0.5–2% itaconic acid, 0 to 25% by weight of another addition-polymerizable α,β-monoethylenically unsaturated monomer, including one or more of an ester of methacrylic acid with an alcohol such as methyl methacrylate, and/or other addition polymerizable monomers such as vinyl versatate, styrene, vinyl toluene, vinyl acetate, or acrylonitrile etc., or mixtures thereof, and the balance of one or more esters of acrylic acid with an alcohol having from 1 to 18 carbon atoms, preferably 1–8 carbon atoms.

The acid component is needed to provide specific adhesion to a wide variety of substrates and especially to those of hydrophilic or metallic character, and as a catalyst to cause curing of an aminoplast component, described hereinafter, when used.

The particular ester of acrylic acid that is employed may be chosen from a wide group including methyl acrylate, ethyl acrylate, butyl acrylate, cyclohexyl acrylate, 2-ethylhexyl acrylate, t-octyl acrylate, dodecyl acrylate, and octadecyl acrylate. Preferably, the copolymers are made using methyl acrylate, ethyl acrylate, butyl acrylate, or 2-ethylhexyl acrylate, because of the availability, efficiency and/or inexpensiveness of those monomers, and more preferably a mixture of ethyl acrylate and butyl acrylate with essentially no other monomers than the unsaturated acid or acids.

Examples of optional cross-linking monomers that may be used in amounts of 0–2%, preferably 0–0.5% of the total monomers, include any copolymerizable compound which contains two or more non-conjugated points of ethylenic unsaturation or two or more non-conjugated vinylidene groups of the structure, $CH_2=C<$, such as divinyltoluene, divinylbenzene, trivinylbenzene, divinylnaphthalene, ethylene glycol diacrylate or dimethacrylate, trimethylene glycol diacrylate or dimethacrylate, 1,4-butylene glycol diacrylate or dimethacrylate, 2-ethylhexane-1,3- dimethacrylate, divinylxylene, divinylethylbenzene, divinyl ether, divinyl sulfone, allyl ethers of polyhydric compounds such as of glycerol, pentaerythritol, sorbitol, sucrose and resorcinol, divinylketone, divinylsulfide, allyl acrylate, diallyl maleate, diallyl fumarate, diallyl phthalate, diallyl succinate, diallyl carbonate, diallyl malonate, diallyl oxalate, diallyl adipate, diallyl sebacate, diallyl tartrate, diallyl silicate, triallyl tricarballylate, triallyl aconitate, triallyl citrate, triallyl phosphate, N,N'-methylenediacrylamide, N,N'-methylenedimethacrylamide, N,N'-ethylidenediacrylamide.

Acrylic copolymers are preferred, but the invention may also be applied to the preparation of other polymers of addition polymerized unsaturated monomers at least predominantly composed of α,β-monoethylenically unsaturated monomers. Examples are polyvinyl acetate and a copolymer of ethylene and vinyl acetate, optionally with small amounts of other monomers such as hydroxyethyl, hydroxypropyl acrylate and methacrylate, N-methylol acrylamide, acrylamide, acrylic acid, methacrylic acid, or itaconic acid, and up to 20% of another optional copolymerizable monomer. Suitable ratios of ethylene to vinyl acetate are 30 to 70 parts of ethylene to 30 to 70 parts of vinyl acetate by weight. The chain terminator may be added similarly to the examples in the present application, in which the vinyl acetate is emulsified and polymerized by pressuring with ethylene during the first portion of the polymerization to give a higher molecular weight product, followed by additional increments of vinyl acetate and ethylene in the presence of chain regulators. In a continuous process, the initial stage or stages of polymerization are conducted in the absence of chain regulator which is then introduced downstream in one or more subsequent sections of the reactor.

The composition may have a pH of about 2 to about 7 or higher but preferably the pH is between 5 and 7. Proportions of the several components of the copolymer are such as to provide a $T_g$ between 10° C. and $-60°$ C., preferably from $-5°$ C. to $-40°$ C.

"$T_g$" or glass transition temperature, is described by Flory, "Principles of Polymer Chemistry," pp. 56 and 57 (1953), Cornell University Press. See also "Polymer Handbook", 2nd Ed., Brandrup and Immergut, Sec. III, pp. 139–142, Interscience (1975). While actual measurement of the $T_g$ can be used, it is difficult to obtain an accurate value on low molecular weight polymers, and it may be calculated as described by Fox, *Bull. Am. Physics Soc.* 1,3, p. 123 (1956), or by the use of "Rohm and Haas Acrylic Glass Temperature Analyzer" Publication No. CM-24 L/cb, Rohm and Haas Company, Philadelphia, Pa., 19105, which are incorporated herein by reference. The actual $T_g$'s of the low molecular weight polymers are lower than the calculated $T_g$ because of low molecular weights. The calculated $T_g$ values, which are essentially the same as measured $T_g$'s of high molecular weight ($>100,000$, $\overline{M}_n$) polymers, are relevant indicia of the relative $T_g$'s of different polymers. The $T_g$ value referred to is the transition temperature or inflection temperature which is found by plotting the modulus of rigidity against temperature. The $T_g$ value here used is that determined at 300 kg./cm.$^2$.

An essential characteristic of the copolymer is that it be of a very broad molecular weight range. The range of molecular weights is obtained by the employment of a chain regulator in an emulsion polymerization procedure as described in more detail hereinafter. The amount of chain regulator may vary, depending upon the particular regulator and the particular conditions of polymerization, but in general from 0.05 to 5% and preferably 0.2 to 1.5% by weight of such chain regulator is employed, such percentage being based on the weight of monomers being polymerized in the presence of free chain regulator.

The heart of the invention is that the polymer compositions have an extremely wide range of molecular weights.

A convenient way of expressing the wide divergence of molecular weights is by means of the "heterogeneity index". This is the ratio of the weight average molecular weight ($\overline{M}_w$) to the number average weight ($\overline{M}_n$). In accordance with the present invention the heterogeneity index is between 15 and 150, preferably 20 to 90, based on molecular weights determined by gel permeation chromatography.

Although the heterogeneity index gives an indication of the range of molecular weights of the polymer fractions in the material, it does not tell the whole story. Thus the gel permeation chromatograms (GPC's) indicate relative quantities of low molecular weight and high molecular weight products. For example, in a conventional emulsion polymerization conducted in the absence of the chain transfer agent, followed after polymerization by utilization of an additional quantity of catalyst or initiator in order to chase residual monomer, the polymer may have a wide molecular weight range of polymer fractions, but the bulk of the polymer, commonly more than 95% of it, is of extremely high molecular weight, well above a million, and only a minor fraction has an extremely low molecular weight. In view of this, in order to further define the invention, another parameter is the relative ratios of low molecular to high molecular weight products and limitations on those molecular weights. Thus, the invention also requires that between about 5% and 70% by weight, preferably between about 10% and 60%, of the product is a low molecular weight fraction having an $\overline{M}_n$ of between about 500 and about 100,000 preferably from about 10,000 to 50,000 and between about 30% and 95%, preferably between about 40% and 90%, of a high molecular weight fraction having a $\overline{M}_n$ of between about 100,000 and about 2,000,000 preferably from about 500,000 to 1,500,000. It is to be understood that ordinarily, as to the preferred $\overline{M}_N$ fractions, additional fractions of intermediate molecular weight polymer will be present.

It has now been found that a highly desirable balance of combinability and elevated temperature performance can be achieved through use of a graduated addition of chain transfer agent (CTA) during formation of an emulsion copolymer, particularly acrylic polymers. In this way, a variety of molecular weight species is formed, and the desired combination of properties is achieved. Thus, a part of the polymerization is conducted in the absence of a free CTA, and in at least one stage of the polymerization, preferably in two stages, the polymerization is conducted in the presence of free chain transfer agent.

The preferred procedure for obtaining products having a high heterogeneity index, as calculated from the ratio of the $\overline{M}_w/\overline{M}_n$, is by initially polymerizing an emulsion of monomers in the absence of a chain terminator, and part way through the polymerization introducing a chain transfer agent in one or more increments and quantities.

If the CTA is added in a first stage, it is used in a quantity such that it is used up by being bound in polymer chains, thus permitting adding additional monomer in the absence of free CTA.

Using the preferred method wherein the first stage is free of CTA, there exists a rather narrow optimum range of the extent of polymerization for introduction of the CTA. To provide the optimum property balance, CTA addition preferably is not begun beore at least 30%, preferably at least 45% of the monomer mix has reacted to high molecular weight product. However, the chain transfer agent addition is commenced before 95%, preferably 90%, and more preferably 75%, of the monomer mix has reacted to completion. Thus, preferably between 45% and 75% of the acrylic monomer is reacted to polymer prior to gradual incorporation of the initial chain transfer agent charge along with monomer emulsion. A second higher amount of CTA is preferably introduced with at least one later portion of monomer.

The water insoluble salt of the copolymer may be that obtained by the use of ammonia, an alkali metal, such as sodium or potassium, or a water-soluble amine such as a lower aliphatic amine of which triethylamine, diethylamine, and trimethylamine, dimethylethanolamine, diethanolamine, or triethanolamine as the source of the cation of the salt of the acid copolymer. Preferably ammonia or a volatile amine is employed as the cation of the salt of the acid copolymer.

Examples of anionic emulsifying agents that may be used for the polymerization include the higher fatty alcohol sulfates, such as sodium lauryl sulfate, the alkyl-aryl sulfonates, such as the sodium salt of t-octylphenyl sulfonate, the sodium dioctyl sulfosuccinates and so on. Examples of the nonionic dispersing agents that may be used for preparing the monomeric emulsions before copolymerization or dispersions of the polymer after polymerization include the following: alkylphenoxypolyethoxyethanols having alkyl groups of about 7 to 18 carbon atoms and 10 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing 10 to 60 or more moles of ethylene oxide with nonyl, dodecyl, tetradecyl, t-dodecyl, and the like mercaptans or with alkylthiophenols having alkyl groups of 6 to 15 carbon atoms; ethylene oxide derivatives of long-chained carboxylic acids, such as lauric, myristic, palmitic, oleic, and the like or mixtures of acids such as found in tall oil containing 10 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 10 to 60 oxyethylene units, etc.; block copolymers of ethylene oxide and propylene oxide comprising a hydrophobic propylene oxide section combined with one or more hydrophilic ethylene oxide sections.

For the copolymerization, peroxidic free-radical catalysts or initiators, including catalytic systems of thermal and redox type, are recommended. Such redox systems, as is well known, are combinations of oxidizing agents and reducing agents such as a combination of potassium persulfate and sodium meta-bisulfite. Other suitable peroxidic agents include the "per-salts" such as the alkali metal and ammonium persulfates and perborates, hydrogen peroxide, organic hydroperoxides such as tert-butyl hydroperoxide and cumene hydroperoxide, and esters such as tert-butyl perbenzoate. Other reducing agents include water-soluble thiosulfates and hydrosulfites. Activators or promoters in the form of the salts such as the sulfates or chlorides of metals which are capable of existing in more than one valence state such as cobalt, iron, nickel, and copper may be used in small amounts.

In the polymerization process the greater the proportion of chain regulator (CTA) used the lower the molecular weight obtained. Examples of well know chain regulators or chain transfer agents which may be used include short- and long-chain alkyl mercaptans, e.g. n-amyl mercaptan, n-dodecyl and, t-dodecyl mercaptan, dialkyl xanthogen disulfides, e.g., diisopropyl xanthogen disulfide, mercaptocarboxylic acids such as mercaptopropionic acid, alkaryl mercaptan such as benzyl mercaptan, long-chain alcohols such as lauryl alcohol and t-octyl alcohol, and halogenated hydrocarbons such as $CCl_4$ $CBrCl_3$, and substituted mercaptans, such as hydroxyethyl mercaptan.

The copolymer dispersions may be made by first mixing the several monomers in the desired proportions into an aqueous solution of an anionic or a non-ionic dispersing or emulsifying agent, or a mixture of both types, to form an emulsion, then polymerizing the mixture, with the aid of a free radical catalyst or initiator. The amount of catalyst can vary but for purposes of efficiency from 0.01 to 1.0%, based on the weight of the monomers, of the peroxidic agent and the same or lower proportions of the reducing agent, if used, are recommended. In this way it is possible to prepare dispersions which contain as little as 1% and as much as 60% or 70% of the resinous copolymer on a weight basis. It is, however, more practical—hence preferred—to produce dispersions which contain about 30 to 60% resin solids.

As is conventional, after the monomer feed is completed, residual monomer is reduced to a minimum by use of a free radical "chaser" catalyst or initiator, by the use of an adsorbent, by heat, by means of a vacuum, or a combination thereof.

After the polymerization, in the event the unsaturated acid is employed therein as a free acid, neutralization of the dispersed copolymer may be obtained, if desired, by the addition of concentrated ammonia, one of the amines mentioned hereinabove, or the hydroxide or carbonate of sodium, potassium, or lithium. If desired, further adjustment of the concentration may be effected by diluting the neutralized dispersion with water. When a filler is employed, the adjustment of the concentration may be effected after the incorporation of the filler instead of before if desired.

The adhesive composition may be colored or substantially colorless. Besides depending on the color of fillers mentioned above, suitable colored pigments may be added in place of, or in addition to, the fillers. Also, if desired, direct dyes may be introduced to provide a desired color.

The molecular weights in the examples were determined by gel permeation chromatography. Gel permeation chromatograms are run on equipment commercially marketed by Waters Assoc. of Marlboro, Mass. Styragel TM columns are available prepacked in a variety of porosities. A column set is normally composed of four or five foot sections chosen to cover the molecular weight range to be measured. With column sets of this length sufficient resolution is obtained so that axial dispersion can be disregarded. The column set must be calibrated for the polymer type whose molecular weight is to be determined. Narrow molecular weight standards are available for polystyrene. Calibration curves for other polymers such as polymethyl methacrylate are constructed from the chromatograms of broad samples using either an approximate distrubution technique[1] or a universal calibration curve technique[2]. To calculate the molecular weights of unknown samples a table is prepared of the value $W_i$, of the GPC curve above baseline at equal volume increments and the molecular weight $\overline{M}_i$, read from the calibration curve at these volumes. The weight average molecular weight $\overline{M}_w$, and the number average molecular weight $\overline{M}_n$, can be calculated from these values with the equations $$\overline{M}_w = W_i M_i / W_i \qquad \overline{M}_n = W_i / W_i / M_i$$

$$W_i = 1$$

It is to be realized that the molecular weight numbers given are approximate and not precise, but are validly used for comparative purposes.

[1] Calibration of Gel-Permeation Column with Unfractionated Polymers, A. Weiss, E. Ginsberg, J. Poly. Sci., Pt. A-2, 8 (1970)
[2] A note on the Universal Calibration Curve for Gel Permeation Chromatography - A. Weiss, E. Ginsberg, Poly. Letters, 7, 379–381 (1969)

The polymers may be utilized to prepare contact cements as taught in copending U.S. application Serial No. 119,916 filed on an even date herewith, and now abandoned, in the names of F. Thomas Sanderson and David R. Gehman, titled "Contact Adhesives".

TEST METHODS

A. Early Grab Testing

1. Measurements Using Heavy Finger Pressure

A moderately heavy brush (5–15 mils when wet) coat of contact adhesive is applied to a 1"×3"×1/20" Formica ® brand melamine-formaldehyde plastic strip, as well as to a 3"×6"×1/2" particle board (40 lb. density). When both surfaces are dry (at clear point), the Formica plastic strip is placed on the particle board and laminated using heavy thumb pressure by rubbing the thumb (with pressure) 6× along each edge of the Formica plastic strip (actual bond area is 1"×2"). The laminate is then qualitatively rated for strength, legs, fusion and bond area, immediately after bonding.

2. Measurements Using Specified Weights

A moderately heavy brush coat (5–15 mils when wet) of contact adhesive is applied to a 2"×4"×1/20" Formica plastic strip and a 3"×6"×1/2" wood particle board. At clear point, the Formica plastic strip is laid across the particle board and the Formica plastic strip surface is very lightly rubbed to assure some adhesive contact area. The sample is then lifted by the overhanging edges (actual bond area is 2"×3") of the Formica plastic strip and suspended for 15 seconds with just the weight of the particle board. If the adhesive bond holds for 15 seconds, a qualitative rating of strength, legs and fusion is determined. The early grab test is then repeated, after roller pressure using just the weight from 2 passes of a 4.5 lb. rubber roller (7 psi). The entire process is then repeated using 2 passes of a 20 lb. roller (22 psi).

B. Lap Shear Adhesion

A thin coat (1–3 mils, dry) of adhesive is brush applied to plastic laminate (1"×3"×1/20" Formica plastic sheet) and to particle board (3"×6"×1/2"). After drying until clear (30–45 minutes), another thin coat (1–3 mils, dry) of adhesive is applied to both previously coated surfaces and again allowed to dry until clear. Within a few minutes after its clear point, the two substrates are bonded together, first with heavy finger pressure and then with two heavy hand pressure passes of a small roller over the assembly. The actual bond area is 1 square inch with a 2 inch Formica strip "handle". The samples are conditioned for 4 days at 77° F. and 50% relative humidity (RH), and then pulled apart by a shear stress, using an Instron Tester at a crosshead speed of 0.2"/min.

C. 158° F. Static Cleavage

Samples are prepared in essentially the same manner as lap shear samples, but with the following differences:
1. The wooden substrate is changed to 3"×6"×1/4" Grade A plywood;

2. Laminate area is 1"×2" long, with a 1" Formica plastic strip "handle";

3. Samples are conditioned for 7 days at 77° F. and 50% R.H.

Actual testing is done by placing the laminates in a 158° F. circulating air oven with a 1 kg weight hanging vertically from the outer edge of the 1" Formica plastic strip "handle". End point is noted at complete failure.

D. Legginess

A criterion sometimes used in the industry for preliminary evaluation of a contact adhesive is the extent to which "legginess" appears in the adhesive upon delamination of two surfaces adhered together. While it is believed that the data herein show that legginess is not essential to a good contact adhesive, it is a quality desired by some users. By legginess is meant the characteristic of the adhesive, when the laminate is forceably delaminated to remain adhered to both surfaces while separating in the nature of stringy connections between the two surfaces as they are pulled apart. If the legs of strings develop over a large proportion of the area adhered together and retain their string shapes when about 0.1 centimeter or more in length, before breaking by cohesive failure, or before delaminating from one or the other surfaces by adhesive failure, the legginess is rated as very good. Of course it is a subjective rating and if there are no legs found the rating is zero. A rating of P is poor, of F is fair, of G is good, of VG is very good, and a Ex. is excellent. Intermediate ratings are stated as, for example, P-F meaning poor to fair.

E. Freeze-Thaw

The latex is frozen for 16 hours at −15° C. and thawed for 8 hours. If the latex does not coagulate after from one to five such cyles, it is deemed to be freeze-thaw stable.

In the following examples the Gelvatol ® 20–30 polyvinyl alcohol has a viscosity in centipoises of a 4% aqueous solution at 20° C. of 4–6, the percent residual polyvinyl acetate determined on a weight basis is 19.5–21.5% the percent hydrolysis of the polyvinyl acetate is 87.7–89%, the weight average molecular weight is approximately 10,000, and the percent ash is 0.75. Gelvatol is a trademark of the Monsanto Company. The Aerotex ® resin M-3, a product of Cyanamid, is a melamine-formaldehyde condensate, and is a known crosslinker for contact adhesives and similar products. Suitable phenolic resins are disclosed in an article by Azrak et al. in *Adhesives Age*, June, 1975, pages 23–28. Phenolic resins are useful in place of the Aerotex product. One such product is designated Bakelite ® phenolic resin CKRA-1834. Other such phenolic tackifiers are designated BXKU-6387 and BKUA-2260, BKUA-2370, 45–48% aqueous dispersions, 40–50 parts of dispersion per 100 parts of 45–60% solids latex. The latter three types of products are water insoluble and have a labile formaldehyde content of 5 to 7%, prepared by first dissolving the phenolic resin in a solvent and emulsifying the same. For example 100 parts of the phenolic resin with 54 parts of toluene and 6 parts of oleic acid is combined with 6 parts of 25% aqueous sodium hydroxide, and 30 parts of 10% ammoniated casein in water, 30 parts of 5% gum arabic in water, and 77 parts of water. The first three ingredients are combined and then introduced into a mixtue of the last four ingredients with high speed agitation. This is then mixed with the latex and other conventional contact adhesive ingredients.

The following are the abbreviations utilized in the examples and specification for monomers, etc.:

| ABBREVIATION | MONOMER |
| --- | --- |
| AA | acrylic acid |
| BA | butyl acrylate |
| BDA | 1,4-butylene diacrylate |
| CTA | chain transfer agent |
| EA | ethyl acrylate |
| EHA | 2-ethylhexyl acrylate |
| IA | itaconic acid |
| IDA | isodecyl acrylate |
| IDMA | isodecyl methacrylate |
| LMA | lauryl methacrylate |
| MAA | methacrylic acid |
| MMA | methyl methacrylate |
| S | styrene |
| VV-10 | vinyl versatate |
| 3-MPA | 3-mercaptopropionic acid |

The following examples, which are illustrative of the invention, the parts and percentages are by weight unless otherwise noted.

Comparative Example A

Emulsion Polymerization of 35EA/55BA/9MAA/1IA with Chain Transfer Agent Introduced into Initial Monomer Emulsion Feed A monomer emulsion is prepared of 270 grams of water, 350 g of ethyl acrylate, 550 g of butyl acrylate and 90 g of metharcylic acid, 10 g of itaconic acid, and 5 g of 3-mercaptylpropionic acid (0.5% monomers) utilizing an anionic emulsifier, using 1.4 g of ammonium bicarbonate, and 50 g of ammonium persulfate. The ammonium bicarbonate and 38 grams of the initiator were introduced into the reactor followed by gradual addition of the remainder of the ammonium persulfate and the monomer emulsion at a relatively constant rate over a period of about 2-1/2 hours. Residual monomer was chased with tertiary butyl hydroperoxide and Formopon and the product was neutralized with ammonia to a pH of about 5.9 Total solids was 56.1%. The $M_n$ is 25,500, the $\overline{M}_w$ is 171,000, and the $\overline{M}_w/\overline{M}_n$ is 6.7.

Low Molecular Weight Emulsion Polymer of EA/BA/MAA/IA 35/55/9/1 with Chain Transfer Agent added to Emulsion before Polymerization.

This example is conducted similarly to Example A utilizing water, 270 g; ethyl arcylate, 350 g; butyl acrylate, 550 g; methacrylic acid, 90 g; itaconic acid, 10 g; 3-mercaptopropionic acid 10 g. The polymer was neutralized to a pH of 6.3 and had a total solids of 54.4%. The $\overline{M}_n$ is $1.4 \times 10^8$, the $\overline{M}_w$ is $0.48 \times 10^5$, and the $\overline{M}_w/\overline{M}_n = 3.5$. Calculated $T_g$ is −30° C.

COMPARATIVE EXAMPLE C

High Molecular Weight Polymer of EA/IA 99/1 Made with Chaser

The product in this example is 99% ethyl acrylate and 1% itaconic acid. It is made with thermal free radical initiation using an anionic emulsifier and 0.4% ammonium persulfate based on monomers. As is conventional, a chaser catalyst is added 15 minutes after the completion of the addition of monomer emulsion.

This product has a high heterogeneity index of about 67 made without a chain transfer agent but made with a chaser. As has been indicated elsewhere herein heterogeneity index by itself does not give the complete story as to the quantity of high and low molecular weight materials, nor does the $\overline{M}_n$ of the mixed fractions of all molecular weights. When a chaser catalyst, i.e., an initiator, is added after the all of the monmers are introduced and are nearly fully polymerized (in order to polymerize residual monomer in the aqueous phase and, if possible, the monomer which is diffused into the polymer particles), such a procedure produces a very small quantity of low molecular weight polymer at the end of the polymerization reaction. As is well known, a large quantity of free radical initiator relative to remaining monomer quantity produces quite low molecular weight materials, especially in emulsion polymerizations. Heterogeneity index thus gives a qualitative indication of the molecular weight distribution but does not do so quantitatively.

To make the monomer emulsion, 9000 g of ethyl acrylate are added to a solution of 44 g of Siponate(TM) DS-4 (23% sodium dodecylbenzene sulfonate) and 100 g itaconic acid in 2700g deionized water, and the mixture emulsified (Mixture A). 3588 g of deionized water are placed in a 22 liter kettle fitted with a reflux condenser, thermometer, and facilities for agitation. Agitation is begun and the contents of the kettle heated to 82°–84° C. A solution of 14 g of ammonium bicarbonate dissolved in 300 g deionized water is added to the kettle followed by a solution of 30 g of ammonium persulfate dissolved in 300 g deionized water. Simultaneous addition of Mixture A and a solution of 10 g of ammonium persulfate dissolved in 262 g deionized water is begun and the temperature allowed to rise to 82°–84° C. where it is maintained for the duration of the polymerization. The rates of the additions are adjusted such that additions are complete in 150 minutes. After the additions are complete, a chaser is added in the form of a free radical initiator. Thereafter, the kettle temperature is lowered to 40° of 37.5 g of aqueous ammonia (28% NH$_3$) in 77.5 g deionized water is added over a period of 15 minutes.

A post additive is next added consisting of a mixture of 200 g of Gelvatol 20-30 (polyvinyl alcohol) and 200 g of Aerotex M-3 (melamine formaldehyde resin) dissolved in 800 g of deionized water. The emulsion is cooled to 25° C. and filtered through a 100 mesh screen to give a product having a pH of 6.8, a Brookfield viscosity of 82 cps and a total solids of 54.3% by weight. The $\overline{M}_n$ is $3 \times 10^4$, the $\overline{M}_w$ is $2 \times 10^6$, and $\overline{M}_w/\overline{M}_n$ is 67.

Comparative Example D

High Molecular Weight Polymer Of EA/BA/MAA/IA 35/55/9/1

This product is prepared by the same method as Example C, is neutralized to a pH of 6.2 has a viscosity of 466 cps. at 25° C., using a Brookfield Model LVF Viscomenter Spindle No. 2, at 30 rpm., and a total solids content of 53.1%. The $\overline{M}_w \times 10^{-5}$ is 8.1 the $\overline{M} \times 10^{-4}$ is 2.0, and the heterogeneity index is 44.5. After the product is cooled to 40° C. Gelvatol 20-+and Aerotex M-3 in the same amounts as in Example C are added. a similar procedure was used to prepare a product designated as Example G.

COMPARATIVE EXAMPLE E

Low Heterogeneity Index Latex Polymer of EA/BA/MAA/IA, 35/55/9/1 0.3% CTA

This is conducted similarly to Example B but with 0.3% mercaptopropionic acid resulting in an $\overline{M}_w \times 10^{-5}$ of 3.5, and an $\overline{M}_n \times 10^{-4}$ of 4.0, giving a heterogeneity index, $\overline{M}_w/\overline{M}_n$, of 8.8.

This demonstrates that when a large amount of chain transfer agent is introduced initially it is not consumed as rapidly and results in a more uniform and narrow distribution of molecular weights.

COMPARATIVE EXAMPLE F

Low Heterogeneity Index Latex Polymer EA/BA/MAA/IA 35/55/9/1, 0.5% CTA

This was conducted similarly to Example B and the foregoing example, utilizing 0.5% mercaptopropionic acid, resulting in an $\overline{M}_w \times 10^{-5}$ of 1.26 an $M_n \times 10^{-4}$ of 2.8 and a heterogeneity index of 4.5.

COMPARATIVE EXAMPLE G

High Molecular Weight Polymer of EA/MMA/IA 88/10/2

This product was made similarly to that of Examples C and D.

EXAMPLE 1

EA/BA/MAA/IA in the Ratios 35/55/1 Using Programed Addition of Chain Transfer Agent to Yield a Mixture of Molecular Weights In this example the chain transfer agent (CTA), 3-mercaptopropionic acid (MPA), is introduced in two stages. The first stage intercepts the monomer addition at 50% of such addition, and 0.5% of the chain transfer agent, based on the weight of 25% of total monomers, is introduced at that point. At the 75% intercept, 1% of the chain transfer agent based on the weight of the remaining monomers, is introduced. The emulsifier is an anionic emulsifier in the form of Siponate TM DS-4 which is sodium dodecyl benzene sulfonate. The polymerization is a conventional emulsion polymerization using gradual monomer addition and ammonium persulfate catalyst.

Twenty grams (20 g.) of itaconic acid and 8.8 g. of Siponate DS-4 are dissolved in 540 g. of deionized water. To this is added 700 g. of ethyl acrylate, 1100 g. of butyl acrylate, and 180 g. of methacrylic acid and the mixture emulsified (Mixture A). A cofeed initiator solution is prepared consisting of 2 g. of ammonium persulfate dissolved in 90 g. of deionized water (Solution B). Four hundred eleven grams (of deionized water are added to a 5000 ml. four-necked flask fitted with a reflux condenser, thermometer and facilities for agitation and heated to 83° C. Two and eight-tenths grams (2.8 g.) of ammonium bicarbonate dissolved in 60 g. of deionized water are added to the flask followed by a solution of 6 g. of ammonium persulfate in 60 g. of deionized water. The gradual addition of Mixture A is begun along with the simultaneous addition of Solution B. Polymerization temperature is maintained at 82°–84° C. After 1274 g. of Mixture A and 46 g. of Solution B have been added to the reaction flask over a 75 minute period, the additions are discontinued. After a 5 minute hold period at 82°–84° C.,5 g. of 3-mercaptopropionic acid (3-MPA) are gradually added to the remaining Mixture A and the simultaneous gradual addition of Mixture A and Solution B to the reaction flask is resumed. After 640 g. of Mixture A and 23 g. of Solution B have been added to the reaction flask over a 38 minute period, the additions are discontinued. After a 5 minute hold period at 82°–84° C., 2.5 g. of 3-mercaptopropionic acid are gradually added to the remaining Mixture A and the simultaneous gradual addition of Mixture A and Solution B to the reaction flask is resumed and completed in 38 minutes. Thirty minutes after the additions are complete, the temperature is lowered to 40° C. and a solution of 14 g. of ammonium bicarbonate and 12 g. of aqueous ammonia (28% $NH_3$) in 234 g. of deionized water is added over a period of 20 minutes. The $\overline{M}_n$ is $2 \times 10^4$, $\overline{M}_w$ is $8.1 \times 10^5$, and the $\overline{M}_w/M\overline{M}_n$ is 39.6. Fifteen minutes after the addition of this neutralizer, a mixture consisting of 40 g. of Aerotex M-3 (melamine formaldehyde resin) and 100 g. of Gelvatol 20–30 (polyvinyl alcohol) dissolved in 400 g. of deionized water is added. After 15 minutes, the emulsion is cooled and filtered to give a product with a pH of 6.4 and a solids of 52% by weight.

Products were prepared in the same way using the monomer ratios EA/BA/MAA/IA of 34.75/55/9/1.25, 35.5/55/9/0.5, and 41/55/2/2 which had similar properties.

EXAMPLE 2

Programmed CTA Addition at Different Intercepts than Example 1 of Monomer Feed, EA/BA/MAA/IA, 35/55/9/1

This was conducted the same way as Example J-1, but the first addition is 0.33% CTA when 60% of the monomers have been introduced, and the second CTA addition is after 85% of the monomers have been fed, and is 1.0% based on the remaining 15% of monomers.

Itaconic acid, 21 g, and 9.3 g of Siponate DS-4 are dissolved in 567 g of deionized water. To this is added 735 g of ethyl acrylate, 1155 g of butyl acrylate, and 189 g of methacrylic acid and the mixture emulsified (Mixture A). 563 g of deionized water are added to a 5000 ml four-necked flask fitted with a reflux condenser, thermometer and facilities for agitation and heated to 83° C. Then 6.3 g of ammonium persulfate is dissolved in 45 g of a preform consisting of a 45% solids acrylic emulsion polymer having a particle size of 0.09–0.1 microns and a composition consisting of butyl acrylate-52 parts, methyl methacrylate - 46.7 parts, and methacrylic acid - 1.3 parts by weight. The gradual addition of Mixture A is begun along with the simultaneous addition of a cofeed initiator solution consisting of a 2 weight percent solution of ammonium persulfate in deionized water (Solution B). Polymerization temperature is maintained at 82°–84° C. After 1606 g of Mixture A and 64 g of Solution B have been added to the reaction flask over a 90 minute period, the additions are discontinued. After a 10 minute hold period at 82°–84° C., simultaneous gradual addition of Mixture A and Solution B to the reaction flask is resumed along with the simultaneous gradual addition of a solution of 1.78 g 3-mercaptopropionic acid (3-MPA) in 32.6 g of deionized water (Solution C). After 669 g of Mixture A, 27 g of Solution B and Solution C have been added to the reaction flask over a period of 40 minutes, the additions are discontinued. After a 10 minute hold period at 82°–84° C., the remaining Mixture A (401 g) and 16 g of Solution B are gradually added to the reaction flask along with the simultaneous gradual addition of a solution of 3.11 g of 3-mercaptopropionic acid in 16.4 g of deionized water (Solution D) over a period of 20 minutes. After the additions are complete, residual monomer is reduced, the temperature is lowered to 40° C. and a solution of 23 g of aqueous ammonia (28% $NH_3$) in 202 g of deionized water is added over a period of 20 minutes. The calculated $T_g$ is $-30°$ C. This product gave excellent results. The $\overline{M}_w/\overline{M}_n$ was at the high end of the range of 15–150, but could not be precisely determined because a fraction thereof was insoluble in the usual solvents used for gel permeation chromatography.

After the addition of the neutralizer, a mixture consisting of 42 g of Aerotex M-3 (melamine formaldehyde resin) and 126 g of Gelvatol 20-30 (polyvinyl alcohol) dissolved in 504 g deionized water is added.

EXAMPLE 3

Preparation of Polymer with High Molecular Weight First Stage and Low Molecular Weight Second Stage of Different Monomer Composition; EA/BA/MAA/IA//BA/AA in the Ratios 31.5/49.5/8.1/0.9//8.5/1.5

The first stage emulsion was water, 292 g; EA, 378 g; BA, 594 g; MAA, 97.2 g; IA, 20.8 g. The second stage was water, 32 g; BA, 102 g; AA, 18 g; 3-MPA, 3.6 g (chain transfer agent).

The polymerization, using Siponate DS-4 as the emulsifier, was conducted similarly to the other emulsion polymerizations above but the first emulsion was introducted over a period of about 2.5 hours, after which the second monomer emulsion feed was commenced, and completed over a period of 35 minutes. The product was cooled to 40° C., and neutralized to a pH of 6.3. It had a viscosity of 6.6 cps with spindle no. 1, 60 rpm using a Brookfield LVF viscometer. The product has a total solids content of 53.6%, and had properties similar to those of Examples 1 and 2.

EXAMPLE 4

Low Molecular Weight Emulsion Polymer of EA/BA/MAA/IA, 35/55/9/1

This example was conducted similarly to Example B but utilized 0.1% mercaptopropionic acid in the emulsion feed. The $M_w \times 10^{-5}$ is 17.2, the $M_n \times 10^{-4}$ is 3.2, and the $M_w/M_n$ equals 53. The product, tested as described herein, has a lap shear adhesion of 177 lb., a 158° F. static cleavage of 1.5 hr., with the early grab strength of fair to good, legs poor and fusion poor.

EXAMPLE 5

Latex Polymer With Staged CTA Introduction EA/BA/MAA/IA, 35/55/9/1

This example was conducted with the same monomers and procedures as in Example 2 but the initial polymerization to achieve a high molecular weight polymer fraction was achieved by feeding 85% of the monomer emulsion before introduction of the chain regulator or chain transfer agent, which was in the amount of 3% based on the remaining monomer, and was 3-mercaptopropionic acid with only one stage in which the chain transfer agent was used. The $M_w \times 10^{-5}$ is 6.8 the $M_n \times 10^{-4}$ is 1.4 and the $M_w/M_n$ is 47.

EXAMPLES 6, 7, 8 AND 9

These were conducted similarly to Example 1.

The results are summarized in Table I, which gives typical examples within the preferred embodiment of the invention and comparative examples.

Table II shows the results of contact adhesives, prepared by utilizing, as in Example C, the same relative quantities of Gelvatol 20-30 and Aerotex M-3.

Table III gives comparisons of Example 2 of the invention involving programmed chain terminator, Example G, a high molecular weight latex polymer made with a chaser but without chain terminator, a commercial acrylic latex product of Union Carbide, and a commercial neoprene latex, Fastbond 30, of 3M Company.

TABLE I

Molecular Weight Modifications of Monomer Ratios of Ex. D
EA/BA/MAA/IA - 35/55/9/1

|  | Ex 4 | Ex E | Ex A | Ex B | Ex 5 | Ex 6 | Ex 7 | Ex 1 | Ex 8 | Ex 9 |
|---|---|---|---|---|---|---|---|---|---|---|
| Type of Molecular Weight Control | | | | | | | | | | |
| Homogeneous addition of chain regulator | | | | | | | | | | |
| % Chain Regulator | 0.1 | 0.3 | 0.5 | 1.0 | — | — | — | — | — | — |
| Stepwise Addition of Chain Regulator | | | | | | | | | | |
| Intercept No. 1 | | | | | | | | | | |
| % of monomer polymerized | — | | | | 85 | 25 | 33 | 50 | 50 | 50 |
| % chain regulator on remaining monomer | — | | | | 3 | 0.5 | 0.5 | 0.5 | 0.25 | 0.5 |
| Intercept No. 2 | | | | | | | | | | |
| % of monomer polymerized | — | | | — | | 50 | 66 | 75 | 75 | 75 |
| Molecular Weight | | | | | | | | | | |
| % chain regulator on remaining monomer | — | | | — | | 1.0 | 1.0 | 1.0 | 0.5 | 0.75 |
| $\overline{M}_w \times 10^{-5}$ | 17.2 | 3.5 | 1.26 | 0.48 | 6.8 | 7.6 | 11.2 | 8.1 | 7.4 | 7.2 |
| $\overline{M}_n \times 10^{-4}$ | 3.2 | 4.0 | 2.8 | 1.4 | 1.4 | 2.0 | 2.3 | 2.0 | 3.5 | 2.1 |
| $\overline{M}_w/\overline{M}_n$ | 53 | 8.8 | 4.5 | 3.5 | 47 | 37 | 49 | 40 | 21 | 34 |

TABLE II

Comparative Performance of Various Molecular Weight Distributions

|  | Ex. H Neoprene Latex* | Ex. G | Ex. D | Ex. A | Ex. E | Ex. 1 | Ex. 2 |
|---|---|---|---|---|---|---|---|
| Intercept No. 1 | | | | | | | |
| % of monomer polymerized | — | — | — | 0 | 85 | 50 | 60 |
| % chain regulator on remaining monomer | — | — | — | 0.5 | 3 | 0.5 | 0.33 |
| Intercept No. 2 | | | | | | | |
| % of monomer polymerized | — | — | — | — | — | 75 | 85 |
| % chain regulator on remaining monomer | — | — | — | — | — | 1.0 | 1.00 |
| Lap Shear Adhesion (psi) | 180-200 | 180-200 | 200-230 | 17 | 170-210 | 150-160 | 271 |
| 158° F. cleavage Resistance (hrs) | 2-6 | 6 | 6 | 0.1 | 6 | 0.3-1.5 | 6 |
| Combinability | | | | | | | |
| Strength | F-G | F-VG | P-F | F-G | G-Exc. | G-VG | VG-Exc |
| Legginess | VG-Exc | Poor | O-P | G-VG | G-VG | F-G | VG-Exc |
| % Fusion | Exc | Poor | O-P | G-VG | FB[2] | 20-FB[2] | FB[2] |
| Cycles, Freeze/Thaw | none | 5 | none | — | — | — | 5 |

[2]Broke Formica
*Fastbond ™ 30

TABLE III

Comparative Performance of Various Systems

|  | Ex. 2[1] | Ex. G[1] | Union Carbide[2] Ucar 154/BKUA- 2370, 100/63 | Fastbond-30[3] |
|---|---|---|---|---|
| Lap Shear Adhesion (psi) | 200 | 180 | 148 | 175 |
| 158° F. Static Cleavage (hrs.) | 3 | 5 | 0.5 | 1.5 |

TABLE III-continued

| | | | Union Carbide[2] Ucar 154/BKUA- | |
|---|---|---|---|---|
| | Ex. 2[1] | Ex. G[1] | 2370, 100/63 | Fastbond-30[3] |
| Resistance to Edge Lift | | | | |
| 140° F. | Pass | Pass | Fail | Pass |
| 158° F. | Pass | Pass | Fail | Pass |
| Early Grab (light pressure) | | | | |
| Strength | Exc | Fair | Exc | Fair |
| Legs | VG | Poor | Fair | VG-Exc |
| Fusion | Formica broke | 5% | Formica broke | 90% |
| Formica Test | | | | |
| Initial grab (no pressure) | Good | None | Good | Good |
| Lamination Pressure Required | Light | Heavy | Light | Light |
| Degree of Fusion | 40% | 30% | 80% | 95% |
| Bond Strength | VG | Fair | VG-Exc | Good |
| Type Failure | C/WF | CF | C/WF | AF |

[1]Tested as neat emulsions - Not formulated with thickener and crosslinker.
[2]A completely formulated system. Ucar 154 unformulated has poor combineability.
[3]A formulated neoprene latex commercial product.
CF = Cohesive Failure
C/WF = Cohesive and wood failure (mixed).
AF = Adhesive Failure

We claim:

1. In a process of preparing an emulsion polymerized latex addition polymer in which the molecular weight of the polymer is widely divergent and the Tg of the polymer is between 10° C. and −60° C., the improvement in which a monomer mixture which is at least predominantly of alpha, beta-monomethylenically unsaturated monomers and is polymerized by a free radical method, the polymerization being conducted in stages in which the first stage of the polymerization is conducted in the absence of a chain transfer agent, whereby a high molecular weight polymer fraction is obtained, and at least one additional stage of the polymerization is conducted in the presence of the chain transfer agent, whereby at least one low molecular weight fraction is obtained, in which from about 5 to 70% of the monomers are polymerized to give a fraction which has a $\overline{M}_n$ of between about 500 and 100,000 and from about 30% to 90% of the monomers are polymerized to give a fraction which has a $\overline{M}_n$ of about 100,000 to at least 2,000,000 and the ratio of $\overline{M}_w/\overline{M}_n$ is from 15 to 150, the molecular weight being determined by gel permeation chromatography.

2. A process of claim 1 conducted in stages within a reactor in which at least one stage of the polymerization reaction is conducted essentially in the absence of a free chain transfer agent and at least one stage of the reaction is conducted in the presence of a free chain transfer agent, said $T_g$ being from about −5° C. to about −40° C.

3. The method of claim 2 in which at least about 30% of the monomers are polymerized in said first stage.

4. The process of claim 3 in which there are at least two stages in which monomer and chain transfer agent are introduced, the quantity of chain transfer agent being greater in the last stage of the reaction, there thus being a first polymerization stage in the absence of chain transfer agent, a second polymerization stage in which a chain transfer agent is utilized, and a third stage in which a larger amount of chain transfer agent is utilized.

5. The process of claim 4 in which 30% to 90% of the monomer mix is reacted when the initial chain transfer agent is introduced and a second introduction of chain transfer agent takes place when between about 50% and 95% of the monomer mix has been reacted.

6. The process of claim 5 in which the initial introduction of chain transfer agent takes place when at least 45% of the monomers have been introduced into the reactor and polymerized, the second introduction of monomer and chain transfer agent takes place when at least 60% of the monomers have been introduced into the reactor and polymerized, and the ratio of $\overline{M}_w/\overline{M}_n$ is from 20 to 90.

7. The process of claim 6 in which the polymer contains 0.5–15% of a carboxylic acid selected from the group consisting of acrylic acid, itaconic acid, fumaric acid, methacrylic acid, and crotonic acid, and mixtures thereof, 0–25% by weight of another addition polymerizable α, β monoethylenically unsaturated monomer including one or more of an ester of methacrylic acid with an alcohol having from 1 to 18 carbon atoms, vinyl versatate, styrene, vinyl toluene, vinyl acetate and acrylonitrile, the balance of the copolymerized monomers being one or more esters of acrylic acid with an alcohol having from 1 to 18 carbon atoms.

8. The process of claim 7 in which the carboxylic acid is a mixture of 5–10% of methacrylic acid with 0.5–2% of itaconic acid, and said ester or esters of acrylic acid have 1 to 8 carbon atoms.

9. The process of claim 7 in which the monomers consist essentially of ethyl acrylate, butyl acrylate and said acids.

10. The process of claim 9 in which the chain transfer agent is selected from long chain alkyl mercaptans, dialkyl xanthogen disulfides, mercaptocarboxylic acids, alkarylmercaptans, long chain alcohols, and halogenated hydrocarbons.

* * * * *